United States Patent
Antonini et al.

[11] Patent Number: 5,813,676
[45] Date of Patent: Sep. 29, 1998

[54] OIL SEAL EXTENDER

[75] Inventors: Joseph Antonini, Chicago; Timothy J. Golema, Lyons, both of Ill.

[73] Assignee: Dana Corporation, Toledo, Ohio

[21] Appl. No.: 573,823

[22] Filed: Dec. 18, 1995

[51] Int. Cl.$^6$ .................................................. F16J 15/32
[52] U.S. Cl. .......................................... 277/551; 277/572
[58] Field of Search ..................................... 277/551, 572

[56] References Cited

U.S. PATENT DOCUMENTS

| | | | |
|---|---|---|---|
| 2,070,126 | 2/1937 | Heinze | 277/50 |
| 3,322,476 | 5/1967 | Lewis | 277/9 |
| 3,338,584 | 8/1967 | Nakanishi et al. | 277/9 |
| 3,396,475 | 8/1968 | Otto | 277/153 |
| 3,727,923 | 4/1973 | McEwen | 277/9 |
| 3,762,726 | 10/1973 | Jornhagen | 277/153 |
| 3,773,336 | 11/1973 | Watler et al. | 277/9 |
| 3,866,813 | 2/1975 | Arnold | 277/9 |
| 4,021,049 | 5/1977 | Phelps et al. | 277/11 |
| 4,226,426 | 10/1980 | Messenger | 277/153 |
| 4,325,557 | 4/1982 | Kawamoto | 277/153 |
| 4,327,922 | 5/1982 | Walther | 277/50 |
| 4,336,945 | 6/1982 | Christiansen et al. | 277/153 |
| 4,421,326 | 12/1983 | Drygalski | 277/50 |
| 4,448,426 | 5/1984 | Jackowski et al. | 277/153 |
| 4,687,211 | 8/1987 | Bessone | 277/50 |
| 5,083,802 | 1/1992 | Shimasaki et al. | 277/152 |
| 5,165,700 | 11/1992 | Stoll et al. | 277/152 |
| 5,201,647 | 4/1993 | Niemiec et al. | 277/9 |
| 5,553,869 | 9/1996 | Stamback | 277/152 |

FOREIGN PATENT DOCUMENTS

| | | | |
|---|---|---|---|
| 1101723 | 10/1955 | France | 277/11 |
| 0493580 | 2/1976 | U.S.S.R. | 277/9 |

*Primary Examiner*—Randolph A. Reese
*Assistant Examiner*—John L. Beres
*Attorney, Agent, or Firm*—Rader, Fishman & Grauer PLLC

[57] ABSTRACT

An annular oil lip seal extender is used to axially reposition a conventional lip seal with respect to a rotating shaft after a wear groove is formed by the rubbing interaction between the lip seal and shaft without the need for a new seal, a new or reground shaft, the use of unreliable thin walled sleeves that fit over the shaft, or overly complicated assemblies that are prone to failure. The extender can be press fitted into the seal and the sub-assembly installed into a conventional housing bore. Alternatively, the extender can be loose fitted into the housing bore and the seal press fitted between the extender and the circumferential extending wall of the housing bore.

21 Claims, 2 Drawing Sheets

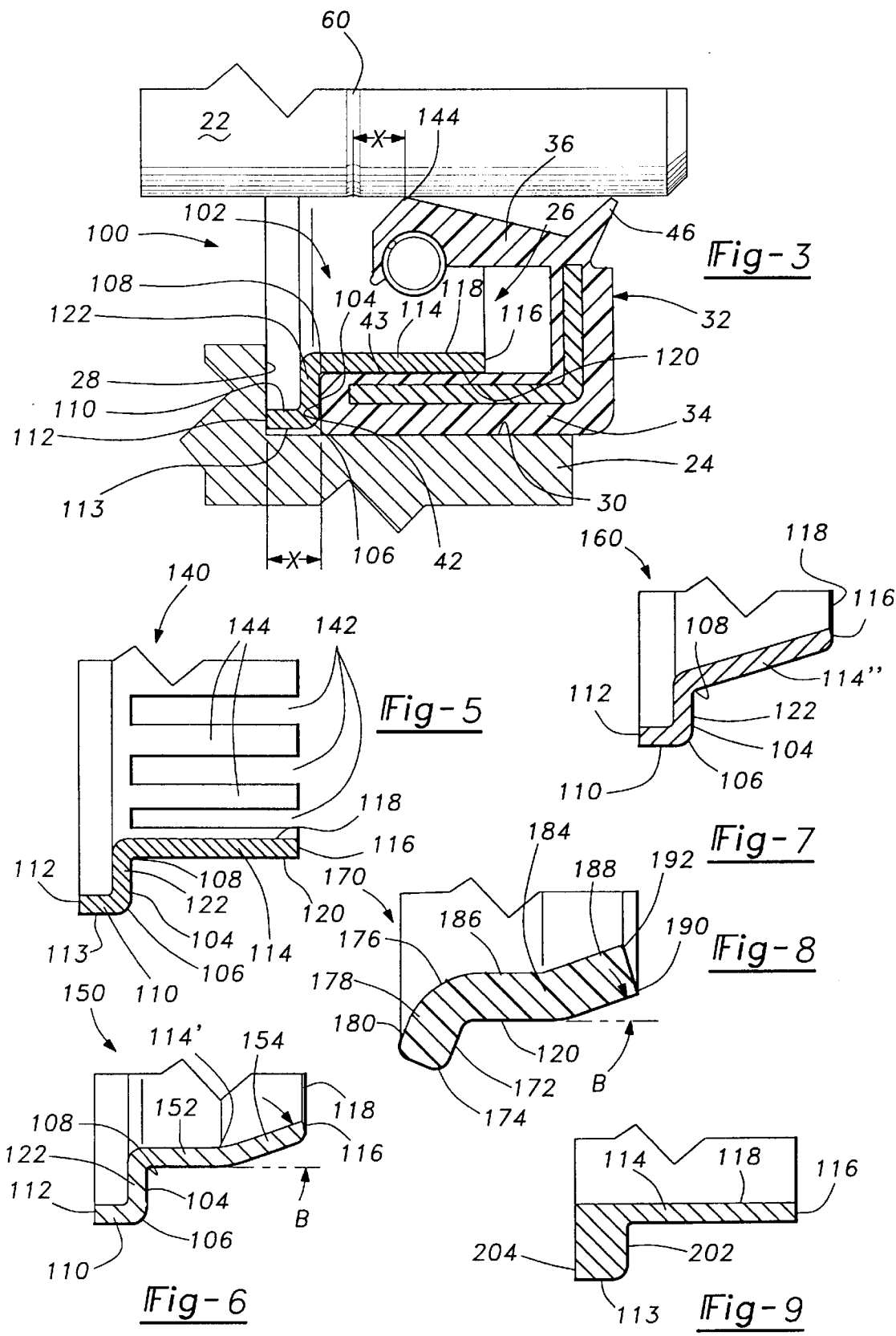

OIL SEAL EXTENDER

FIELD OF THE INVENTION

The present invention relates to an oil seal extender which is used to reposition a conventional oil lip seal axially along a shaft after a groove is formed on the shaft's outer surface through the rubbing interaction of the oil lip seal with the rotating shaft.

BACKGROUND OF THE INVENTION

As illustrated in prior art FIG. 1, annular oil seal assemblies 20 are well known to provide a dynamic seal with respect to a rotating shaft 22 such as a crankshaft. Seal assembly 20 includes a stationary housing 24 such as an engine block with a bore 26 which circumscribes an axial extending axis A—A. Bore 26 has a floor 28 and a circumferential extending wall 30 which is parallel to axis A—A. Shaft 22 passes through bore 26 and is centered such that its axis of rotation corresponds to axis A—A of the bore.

An oil lip seal 32 is received in bore 26. Lip seal 32 has a radially outer section 34 and a radially inner section 36 with a transition zone 38 disposed between them. Radially outer section 34 has an outer periphery 40 that contacts wall 30, a base 42 that contacts floor 28, and an inner periphery 43. Radially inner section 36 includes a primary lip 44 and a secondary lip 46 axially displaced from the primary lip. Lips 44 and 46 contact shaft 22 to provide both a primary and secondary dynamic oil seal as oil flows from the engine towards primary seal 44. Lip 46 also acts as a dust seal to keep dust out of assembly 20. A garter spring 48 received within a groove 50 of inner section 36 biases primary lip 44 radially inwardly toward shaft 22 to maximize the sealing action of the primary seal. Lip seal 32 is typically formed from an elastomeric material such as rubber. To improve the structural integrity of seal 32 and assure proper contact between the seal and both shaft 22 and bore 26, a metallic reinforcement 51, shown with an L-shaped cross-section in FIG. 1, is often embedded within seal 32. As illustrated, a first leg 52 extends along most of radially outer section 34 and a second perpendicular leg 54 extends in the transition zone 38 between radially outer section 34 and radially inner section 36. Alternatively, however, seal 32 may include a metallic outer casing about radially outer section 34 and transition zone 38.

Seals have an undesirable tendency to groove rotating shafts 22 because of a rubbing interaction which occurs between lips 44 and 46 of seal 32 and the outer surface of the shaft along the corresponding lines of contact 56 and 58. The increased biasing provided by garter spring 48 to improve the sealing action of primary lip 44 aggravates the wear problem. As shown in FIG. 2, a groove 60 forms along line of contact 56. Groove 60 reduces the available bias of lip 44 upon the shaft and provides a path for oil seepage as shown by the arrows. Such a path is considered a failure to assembly 20.

Even if a new seal 32 is installed, leakage is likely. The formation of groove 60 through a polishing action affects the finish of shaft 22 and has a debilitating affect on lip 44. Additionally, to the extent that primary lip 44 rests within groove 60, the biasing action of the seal is reduced. Further, lip 44 of a new seal 32 may not exactly follow the contour of groove 60 about the entire circumference of shaft 22. Thus, lip 44 rests both in and out of groove 60 at different locations about the circumference of shaft 22, providing additional possible paths for oil leakage.

Once a groove 60 is formed in shaft 22, it has been known to fit a thin wall sleeve over shaft 22. However, such sleeves are expensive, easily damaged, and difficult to install, requiring special installation tools. For example, once a sleeve is bent or lightly scratched, it must be discarded. Even if correctly installed, however, a thin wall sleeve adds an in interference fit to a previously optimally determined lip seal 32 and possibly a different surface finish, accelerating seal wear and shortening the seal's life.

Rather than using a thin wall sleeve, it is also known to remove and regrind shaft 22 to remove groove 60, thereby reducing the entire diameter of the shaft. As a result, a different seal 32 is then required. Providing a wide range of different seals incurs undesirable expense. Even if such seals are available it is difficult to determine which one will perform optimally in a particular assembly 20 without extensive testing.

Finally, it is known to axially reposition specialized seals with respect to a rotating shaft. However, the seals are part of an unduly complex multi-component assembly comprising numerous additional elements and tight tolerances. In one example, an adapter and a retainer carrying a single seal are threadably coupled such that selective rotation of one with respect to the other permits the axial location of the retainer carrying the single lip seal to be changed. In practice, however, foreign matter becomes entrapped in the threads, compromising the performance of the assembly.

In another example, a ring shaped retainer has a hollow cylindrical cavity. A plurality of ring shaped gaskets received in the cavity act as spacers such that a single lip seal can be positioned between any two adjacent spacers. However, complete disassembly of the retainer and a reordering of the spacers and lip seal is required. Parts are easily misplaced during such disassembly. Equally important, however, is the wear imparted to the spacers in combination with the affects of the outside environment. The tight tolerances which are required are compromised over time, particularly when the device is disassembled, resulting in unwanted play in the seal and the increased likelihood of oil leakage and resulting failure.

SUMMARY OF THE INVENTION

The present invention is directed to a one-piece integral oil seal extender that relocates a conventional oil lip seal axially away from a wear groove formed in a mating rotating shaft without the need for a new different sized seal, new or reground shafts, the use of unreliable thin walled sleeves that fit over the shaft, or unduly complicated assemblies that are prone to failure.

The inventive oil seal extender may be used to retrofit pre-existing conventional oil seal assemblies by axially repositioning a conventional oil lip seal in a conventional housing bore once a groove is formed along a line of contact between the seal and an outer surface of a rotating shaft. The extender is easily installed and customized for a wide range of different applications. Sturdy, the extender can withstand accidental droppage and scratching without failing. When using the oil seal extender of the present invention, the oil lip seal may interact with the shaft as it was optimized to do without requiring special modifications or adjustments to the oil lip seal, the shaft or the housing.

The lip seal comprises a step having a radially outer edge and a radially inner edge. An annular lower section extends axially away from the radially outer edge of the step and terminates at a base adapted to contact a floor of a bore formed in the stationary housing in which the oil seal rests. The annular lower section has a radially outermost periphery adapted to be adjacent a circumferential extending wall of the bore. An annular upper section extends axially away from the radially inner edge of the step in a direction opposite the annular upper section and terminates at a tip. The annular upper section has a radially innermost periphery adapted to be spaced a greatest radial distance from the bore wall.

In several embodiments the oil seal extender is formed from a metallic material of constant wall thickness. Examples of acceptable materials include cold-rolled steel, brass, copper, aluminum, or plastic. The base and the step may represent opposing walls of the material. Alternatively, the step may correspond to a distinct central section disposed between the lower and upper sections such that the extender has a somewhat S-shaped cross section. In at least one embodiment, where the base extends from the outermost periphery to the innermost periphery of the extender, the oil seal extender is formed from plastic.

To prevent unwanted lip seal movement, the annular upper section preferably includes an outer periphery having a radius greater than a corresponding inner periphery of the outer section of the oil seal to create an interference fit between the oil seal extender and the oil seal. The extender can be press fitted into the seal and the sub-assembly Installed into the housing bore. Alternatively, the extender can be loose fitted into the housing bore and the seal fitted between the extender and the wall of the bore. To promote assembly, the upper annular section may include an angled portion or a plurality of fingers capable of deformation independently of one another.

The axial extent between the tip of the oil seal extender and the step corresponds to the displacement of the oil seal from its original position in contact with the floor of the bore and a corresponding displacement from a pre-existing wear groove. Thus, axial movement of the lip with respect to any one wear groove is easily accomplished merely by using different oil seal extenders of various axial lengths.

BRIEF DESCRIPTION OF THE DRAWINGS

The features and inventive aspects of the present invention will become more apparent upon reading the following detailed description, claims, and drawings, of which the following is a brief description:

FIG. 3 is a cross-sectional view of the assembly of FIG. 1 after the insertion of an oil seal extender according to a first embodiment of the invention.

FIG. 5 is a cross-sectional view of a second embodiment of the oil seal extender.

FIG. 6 is a cross-sectional view of a third embodiment of the oil seal extender.

FIG. 7 is a cross-sectional view of a fourth embodiment of the oil seal extender.

FIG. 8 is across-sectional view of a fifth embodiment of the oil seal extender.

FIG. 9 is a cross-sectional view of a sixth embodiment of the oil seal extender.

DETAILED DESCRIPTION OF PREFERRED EMBODIMENTS

Figure 1:
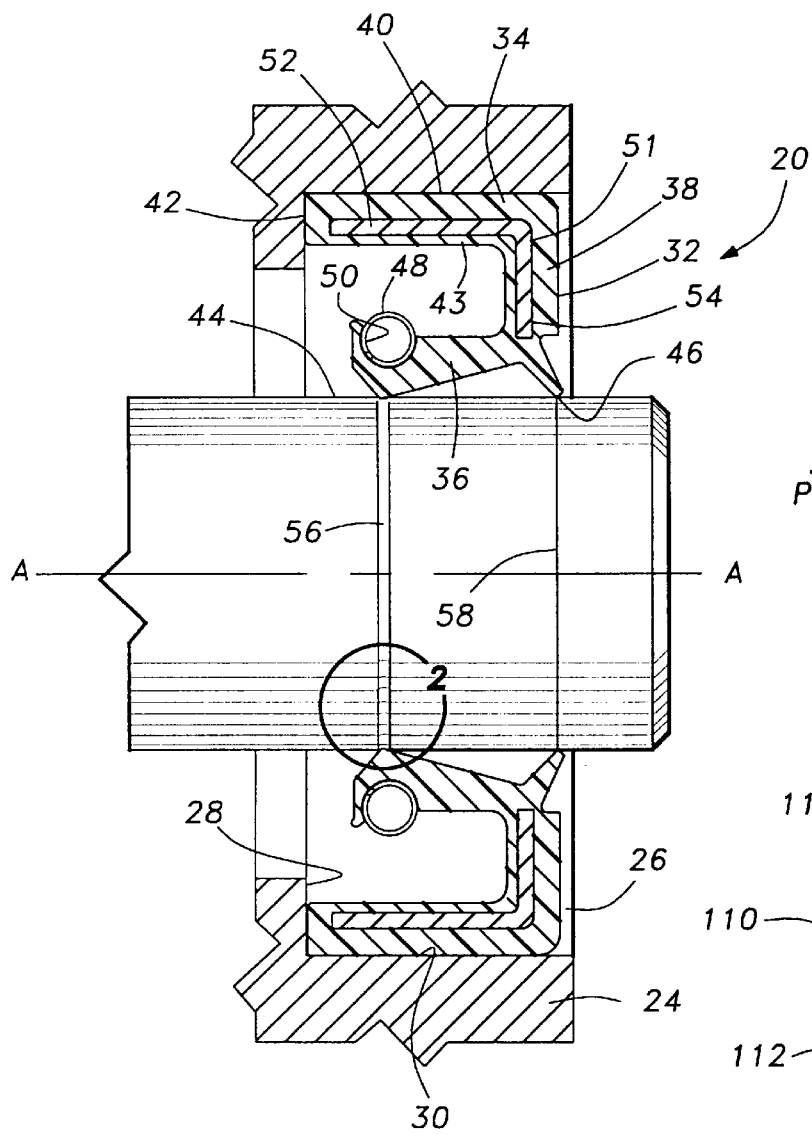
FIG. 1 is a prior art view of a conventional oil seal assembly including a cross-sectional view of a stationary housing with a bore and oil lip seal. A rotating shaft is shown with a groove formed in its outer surface by the rubbing interaction which takes place between the seal and the shaft.

An annular oil seal assembly 100 is illustrated in FIG. 3. Assembly 100 is used to provide a dynamic seal with respect to a rotating shaft 22. Seal assembly 100 includes a conventional housing 24 discussed in the Background of the Invention with a bore 26 circumscribing an axis A—A. Bore 26 has a floor 28 and a circumferential extending wall 30. Assembly 100 also includes a conventional lip seal 32, also discussed in the Background of the Invention. However, unlike the prior art, assembly also includes a one-piece integral oil seal extender 102 adapted to be received in conventional bore 26 of housing 24.

Extender 102 includes a step 104 having a radially outer edge 106 and a radially inner edge 108. An annular lower section 110 extends axially away from the radially outer edge 106 and terminates at a base 112 which is in contact with floor 28. Base 112 is radially offset from radially inner edge 108. Lower section 110 defines the radially outermost periphery 113 of extender 102. It is also generally parallel axis A—A its entire length between edge 106 and base 112 and adjacent to wall 30.

An axial displacement "X" measured from base 112 and step 104 corresponds to the displacement "X" of lip 44 from the centerline of groove 60 as compared to assembly 20 of FIG. 1. The change in axial displacement of seal 32 along shaft 22 is easily modified merely be using an oil seal extender with a different displacement "X". Thus, over time various seal extenders may be used in the same assembly as wear grooves form on rotating shaft 22.

An annular upper section 114 extends axially away from radially inner edge 108 in a direction opposite that of lower section 110 and terminates at a tip 116. Upper section 114 defines the radially innermost periphery 118 of extender 102 and is spaced the greatest radial distance from wall 30. Further, upper section 114 is generally parallel axis A—A its entire length between edge 108 and tip 116. The upper section preferably extends more than half the total extent of outer portion 38 of seal 32 to provide sufficient area of contact between the extender and seal. Such an axial extent is of particular importance when an outer periphery 120 of the upper section has a radius greater than a corresponding inner periphery 43 of outer section 34 of seal 32 to create an Interference fit between extender and the oil seal. An interference fit is generally preferred to assure that seal 32 is snugly retained and compressed between wall 30 and extender 102 to prevent undesirable movement which could compromise seal performance.

Base 42 of seal 32 also contacts step 104. In the illustrated embodiment, step 104 corresponds to a distinct central section 122 disposed between lower section 110 and upper section 114 that is adapted to be generally perpendicular to axis A—A. Thus, in cross-section extender 102 is somewhat S-shaped.

Extender 102 can be press fitted into seal 32 through the interference fit discussed above and the sub-assembly inserted into housing bore 26. Alternatively, however, the extender can be loose fitted into bore 26 and seal 32 fitted between extender 32 and wall 30 until base 42 contacts step 104. Because of the relative dimensions of lower Section 110 and upper Section 114 compared to the corresponding dimensions of seal 32, extender 102 cannot be misinstalled.

Extender 102 is formed from a material of constant wall thickness and typically a metal. Preferred metals include cold-rolled steel, brass, copper, and aluminum. If formed from steel, extender 102 also has a black oxide coating to prevent rusting and to improve appearance. In one embodiment, extender 102 has a material thickness of approximately 0.05 inches (1.3 mm) and extends approximately 0.375 inches (9.5 mm). Lower portion 110 extends approximately 0.125 inches (3.2 mm) while step 104 extends approximately 0.065 inches (1.7 mm). These values may be greater or smaller depending on the particular application. The corners of the extender may be slightly radiused. Sturdy, extender 102 can withstand accidental droppage or scratching without failing.

Figure 4:
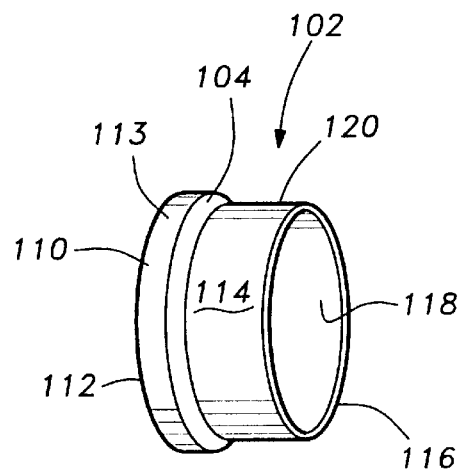
FIG. 4 is a perspective view of the first embodiment of the oil seal extender.
Figure 2:
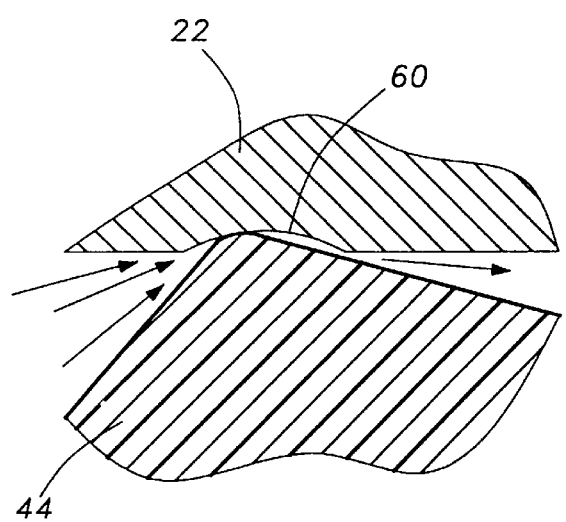
FIG. 2 is a cross sectional view of the seal and shaft groove as shown by the encircled region 2 of FIG. 1.

Extender 102 is shown in perspective in FIG. 4. Because the extender is typically made from metal, it can be difficult to either press fit extender 102 into seal 32 or to fit seal 32 between upper section 114 and wall 30 because the metal will not readily deform.

An alternative embodiment of the present invention, an extender 140 is illustrated in FIG. 5. Extender 140 is similar to extender 102. However, it includes a plurality of circumferentially spaced slots 142 extending from tip 116 toward step 104. Thus, upper section 114 comprises a plurality of flexible fingers 144, each finger 144 formed between each of two adjacent slots. The fingers are readily deformable and aid in assembly.

The formation of slots can be expensive, however. Therefore, a different alternative embodiment, an extender 150 is shown in FIG. 6. Extender 150 is also similar to extender 102. However, instead of slots 142, annular upper section 114' is broken into two portions, an inner portion 152 adjacent step 104 which extends in a direction generally parallel to axis A—A and an outer portion 154 which is positioned between inner portion 152 and tip 116. Outer portion 154 extends approximately 0.125 inches (3.2 mm) if the overall length of the extender is the same as for extender 102. Tip 116 is angled radially inwardly by a value "B" such that only the tip defines the radially innermost periphery 118 of extender 150. Preferably, the value of B is approximately 15 degrees with respect to axis A—A. Angled outer portion 154 acts as a guide to promote easier assembly of seal 32 with the extender, or the insertion of seal 32 into bore 26 if extender 150 is first loose fitted into bore 26.

An oil seal extender 160 is shown in FIG. 7. Extender 160 is similar to extender 102. However, unlike annular upper section 114 of extender 102, annular upper portion 114" of extender 160 is angled with respect to axis A—A. Such an angle is required when outer surface 43 of seal 32 has such an angle to assure adequate fit along the entire length of portion 114.

A different embodiment of the present invention, an oil seal extender 170, is illustrated in FIG. 8. Extender 170 has a step 172 with a radially outer edge 174 and a radially inner edge 176. An annular lower section 178 extends axially away from outer edge 174 and terminates at a base 180. Annular lower section 178 defines the radially outermost periphery 182 of extender 170. Extender 170 also includes an annular upper section 184 with an inner portion 186 generally parallel to axis A—A and an angled outer portion 188 similar to that illustrated in FIG. 5. Upper section 184 terminates at a tip 190. Tip 190 also defines the radially innermost periphery 192 of extender 170 and is spaced the greatest radial distance from bore wall 30.

Like the embodiments of FIGS. 3 through 7, extender 170 is made from material of constant wall thickness. However, the material is thicker at approximately 0.080 inches (2.0 mm). Unlike the embodiments of FIGS. 3 through 7, extender 170 lacks a distinct central section 122. Instead step 172 and base 180 represent opposing walls of the material. Further, step 172 is not generally perpendicular to axis A—A, being angled greater than ninety (90) degrees with respect to inner portion 186 of upper section 184. Such angles may be required under some circumstances for both ease of manufacturing and to assure that lips 44 and 46 of seal 32 properly engage shaft 22. Finally, base 180 extends between edges 174 and 176 to provide additional axial support between floor 28 and the extender.

A final embodiment, an oil seal extender 200 is illustrated in FIG. 9. Upper annular portion 114 corresponds to that of extender 102. However, extender 200 lacks a distinct central section 122. Instead, a step 202 is integral with a base 204 extending between the radially innermost periphery 118 and the radially outermost periphery 113. Such an extender is generally required when using plastics rather than metallic materials of constant cross-section to ease manufacturing and to provide adequate strength to the oil seal extender.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A one-piece oil seal extender received in an annular bore of a housing, the bore circumscribing an axially extending axis and defining a floor and a circumferential extending wall, said extender comprising:
   a step having a radially outer edge and a radially inner edge;
   an annular outer section extending axially away from said radially outer edge of said step and terminating at a base selectively engaging the floor of the bore to define a predetermined axial distance for offsetting a seal from an original axial operational location to a new axial operational location defined by said predetermined axial distance, said annular outer section having a radially outermost periphery selectively engaging the wall of the bore; and
   an annular inner section extending axially away from said radially inner edge of said step in a direction opposite said annular outer section and terminating at a tip, said annular inner section having a radially innermost periphery spaced a greatest radial distance from the wall of the bore.

2. An oil seal extender as recited in claim 1, wherein said oil seal extender is formed from a material of constant wall thickness.

3. An oil seal extender as recited in claim 2, wherein said step and said base represent opposing walls of said material.

4. An oil seal extender as recited in claim 3, wherein said step is angled greater than 90 degrees with respect to an adjacent radially outer surface of said inner annular section.

5. An oil seal extender as recited in claim 2, wherein said step corresponds to a distinct central section disposed between said outer section and said inner section such that said oil seal extender has a somewhat S-shaped cross-section.

6. An oil seal extender as recited in claim 5, wherein said central section is adapted to be generally perpendicular to the axis of the bore and said inner section is adapted to be generally parallel to the axis of the bore.

7. An oil seal extender as recited in claim 1, wherein said annular inner section extends in a direction parallel to the axis of the bore between said radially inner edge and said tip.

8. An oil seal extender as recited in claim 7, wherein said inner annular section includes a plurality of circumferentially spaced slots extending from said tip toward said step, a flexible finger formed between each of two adjacent slots.

9. An oil seal extender as recited in claim 1, wherein said inner annular section comprises an inner portion adjacent said step which extends in a direction parallel to the axis of the bore.

10. An oil seal extender as recited in claim 9, said inner annular section comprising an outer portion positioned between said inner portion and said tip which is angled radially inwardly such that only said tip defines said radially innermost periphery.

11. An oil seal extender as recited in claim 10, wherein said outer portion is adapted to be angled approximately 15 degrees from the axis of the bore.

12. An oil seal extender as recited in claim 1, wherein said inner annular section is angled radially inwardly of said inner radial edge of said step such that only said tip defines said radially innermost periphery.

13. An oil seal extender as recited in claim 1, wherein said base is radially offset from said radially innermost periphery.

14. Al oil seal extender as recited in claim 1, wherein said base extends between said radially outermost periphery and said radially innermost periphery.

15. An oil seal extender as recited in claim 14, wherein said extender is formed from plastic.

16. An oil seal extender as recited in claim 1, wherein said material is one of cold-rolled steel, brass, copper, and aluminum.

17. An oil seal sub-assembly comprising:
    an annular oil seal circumscribing an axis, said oil seal having a radially outer section and a radially inner section; and
    a one-piece annular oil seal extender, said extender including
        a step having a radially outer edge and a radially inner edge,
        an annular outer section extending axially away from said radially outer edge of said step and terminating at a base to define a predetermined axial distance for offsetting said seal from an original axial operational location to a new axial operational location defined by said predetermined axial distance, said annular outer section having a radially outermost periphery, and
        an annular inner section extending axially away from said radially inner edge of said step in a direction opposite said annular outer section and terminating at a tip, said annular inner section having a radially innermost periphery and an outer periphery,
    wherein said oil seal selectively contacts both said step and said inner annular section.

18. An oil seal sub-assembly as recited in claim 17, wherein said annular inner section has a radius greater than a corresponding inner periphery of said outer section of said oil seal to create an interference fit between said oil seal extender and said oil seal.

19. An oil seal assembly comprising:
    a housing, said housing having a bore circumscribing an axially extending axis and defining a floor and a circumferential extending wall;
    an annular shaft radially centered within said bore;
    an oil seal, said oil seal having a radially outer section and a radially inner section, a primary lip of said radially inner section contacting said shaft; and
    a one-piece oil seal extender received in said bore of said housing, said extender including
        a step having a radially outer edge and a radially inner edge,
        an annular outer section extending axially away from said radially outer edge of said step and terminating at a base selectively engaging said floor of said bore to define a predetermined axial distance for offsetting said seal from an original axial operational location to a new axial operational location defined by said predetermined axial distance, said annular outer section having a radially outermost periphery adjacent said wall of said bore, and
    an annular inner section extending axially away from said radially inner edge of said step in a direction opposite said annular outer section and terminating at a tip, said annular inner section having a radially innermost periphery spaced a greatest radial distance from the wall of the bore, wherein said oil seal is enclosed by and selectively engages said step, said annular inner section, and said circumferentially extending wall of said bore.

20. An assembly as recited in claim 19, said annular inner section including an outer periphery having a radius greater than a corresponding inner periphery of said outer section of said oil seal to create an interference fit between said oil seal extender and said oil seal.

21. An assembly as recited in claim 20, wherein said oil seal is adjacent said step of said oil seal extender such that an axial extent between said tip of said oil seal extender and said step corresponds to an axial extent of said oil seal from said floor of said bore.

* * * * *

UNITED STATES PATENT AND TRADEMARK OFFICE
CERTIFICATE OF CORRECTION

PATENT NO : 5,813,676
DATED : September 29, 1998
INVENTOR(S) : Joseph Antonini et al.

It is certified that error appears in the above-identified patent and that said Letters Patent is hereby corrected as shown below:

Col. 7, line 15
 replace "Al"
 with --An--.

Signed and Sealed this

Twenty-ninth Day of December, 1998

Attest:

BRUCE LEHMAN

Attesting Officer  Commissioner of Patents and Trademarks